United States Patent

De Pratti

[15] 3,646,395
[45] Feb. 29, 1972

[54] HIGH REPETITION RATE LASER OPTICAL PUMPING SYSTEM

[72] Inventor: Normand P. De Pratti, Southbridge, Mass.

[73] Assignee: American Optical Corporation, Southbridge, Mass.

[22] Filed: May 15, 1970

[21] Appl. No.: 37,547

[52] U.S. Cl. .............................................. 315/242 P, 315/208
[51] Int. Cl. .................................................................. H01s 3/09
[58] Field of Search ................... 315/160, 167, 169, 170, 171, 315/172, 173, 176, 200 R, 202, 208, 241 R, 242, 242 P

[56] References Cited

UNITED STATES PATENTS 3,551,738  12/1970  Young ................................. 315/171

*Primary Examiner*—Alfred L. Brody
*Attorney*—William C. Nealon, Noble S. Williams and Robert J. Bird

[57] ABSTRACT

A system for optically pumping a laser at high-repetition rates. This system utilizes a discharge from a high-voltage capacitor into a laser-exciting flashlamp. The capacitor discharge is controlled by switching action of a hydrogen thyratron tube. The thyratron switch is made to close when each voltage pulse in a pulse train is applied to a thyratron control grid. The switch is automatically opened after capacitor-discharge, by maintaining capacitor voltage below the ionization potential of a thyratron tube for a fixed period of time.

5 Claims, 7 Drawing Figures

INVENTOR.
NORMAND P. De PRATTI
BY William C. Vealen
ATTORNEY

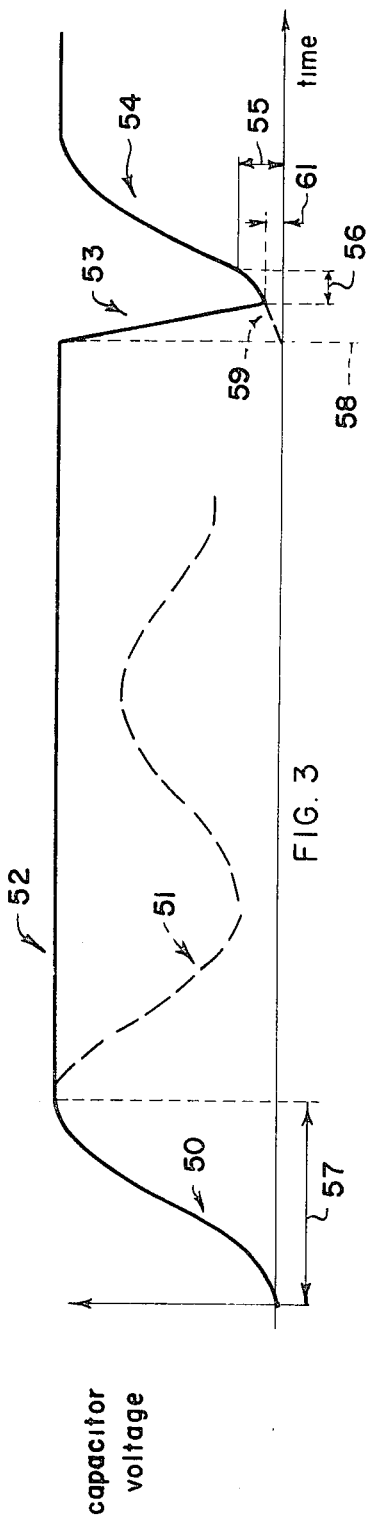
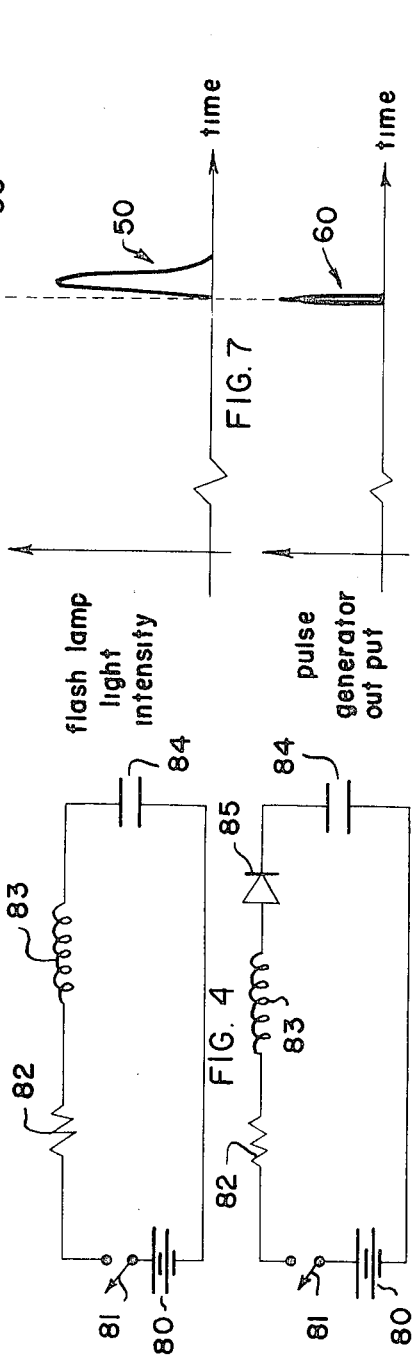

HIGH REPETITION RATE LASER OPTICAL PUMPING SYSTEM

BACKGROUND OF THE INVENTION

This invention relates to means for optically pumping a laser. More particularly, this invention relates to means for optically pumping a laser at a high repetition rate and wherein a single ionization tube switch is employed in the electrical pulsing of a laser flashlamp.

A common problem with laser systems operating at high repetition rates is failure of flashlamps to deionize between successive electrical pulses. A typical flashlamp is comprised of xenon gas which has a property of maintaining a low impedance after it has been ionized. In fact, a small bias current can maintain a flashlamp in a low impedance ionized state after a large voltage pulse ionizes the gas.

Ordinarily, a capacitor is employed as means for storing and applying energy to a flashlamp causing emission of a pulse of light. Charging current for this capacitor is proportional to charging frequency, or repetition rate, as can be noted from the known equation:

$$i = c(de/dt) \qquad (1)$$

where $i$ represents current, $C$ represents capacitance and $(de/dt)$ represents time rate of change of voltage. One observes that current magnitude is directly proportional to capacitor charging frequency or repetition rate.

Since a small current is required to maintain the flashlamp conducting after it is ionized, a flashlamp "turnoff" problem arises due to large capacitor charging-currents associated with high repetition rates. Current does not decrease below a "holding-current" level, (and corresponding capacitor voltage does not decrease below a "holding-voltage" level), for short flashlamps used in high repetition rate laser systems. The flashlamp remains in an ionized state preventing repetitive operation.

In a prior art approach, the flashlamp is biased continuously "on" at a low current level and an ionization tube in the discharge path of the capacitor is used as a switch to transfer energy from capacitor to flashlamp. The turnoff problem is shifted from the flashlamp to a discharge-path ionization tube. The problem is solved by use of an additional charge-path tube.

One tube is used in the capacitor discharge path and the other tube is used in the capacitor charge path. These two tubes are sequentially pulsed so as to reduce capacitor charge current to zero for a short finite time after the capacitor discharges. The zero-current condition imposed by deionization of the charge-path ionization tube insures discharge-path ionization tube turnoff.

Prior art use of two ionization tubes has certain disadvantages. For example, it requires that a delay be provided for sequential ionization of the tubes to assure adequate time for flashlamp deionization. The delay and its associated circuitry is a complication giving rise to design problems.

Also, a current-limiting resistor in the charge path is necessary. The effect of this resistor is to limit charge-path efficiency to 50 percent, limiting overall system efficiency to less than 50 percent.

Ionization tube grids are used to control the conduction state of the tube. A further problem associated with ionization tubes, therefore, is generation of electrical pulses to be applied to these tube grids. Typically, ignatron or hydrogen thyratron tubes are employed. They have low grid-cathode impedances in the neighborhood of 40–100 ohms. This necessitates a complicated grid drive circuitry.

My invention is an improvement over the prior art wherein it requires utilization of only one switching ionization tube. A reduction of the number of switching tubes by 50 percent considerably reduces complicated circuitry required in the generation of sequential trigger pulses. My invention eliminates delay circuitry and automatically assures turn off of the discharge-path ionization tube. Additionally, my invention allows an overall system efficiency of 85 percent.

It is thus an object of the present invention to provide an improved and more efficient system for optically pumping a laser.

It is another object of the present invention to provide means for optically pumping a laser incorporating a single ionization tube switch.

It is a further object of the present invention to provide improved means for laser excitation at high repetition rates.

BRIEF DESCRIPTION OF THE DRAWINGS

The following description of one embodiment of my invention is give, by way of example, with respect to the accompanying drawings wherein:

FIG. 3 is a graphical representation of capacitor voltage versus time of the capacitor utilized in the preferred embodiment of the present invention, FIG. 4 is a representation similar to FIG. 2 showing diagrammatically a charging circuit without a diode, FIG. 5 is a representation similar to FIG. 2 showing diagrammatically a circuit with a diode, FIG. 6 is a graphical representation of pulse generator output versus time, in proper time relationship with FIG. 3, and FIG. 7 is a graphical representation of flashlamp light intensity versus time, in proper timed relationship with FIG. 3.

DESCRIPTION OF THE PREFERRED EMBODIMENT

A laser excitation flashlamp is biased continually "on" at a low current level. A capacitor is arranged to discharge through an ionized thyratron switch into the flashlamp providing a pulse of light excitation to a laser. The thyratron switch is operated (ionized) in response to each of a series of pulses from a pulse generator applied to a control grid of the thyratron. The thyratron is in the discharge-path of the capacitor.

The capacitor is charged from a DC voltage source through a series arrangement of an inductor and diode. The inductor controls charge rate of the capacitor. The capacitor discharges at a rate approximately 50 times greater than the rate at which it charges.

In operation, at the time of capacitor discharge in response to ionization of gases in the thyratron, the capacitor also starts to slowly charge through both inductor and diode. The waveshape of capacitor voltage immediately after capacitor discharge, approximates a negative cosine function. The initial relatively slow risetime associated with this function causes capacitor voltage to remain below ionization potential of the thyratron tube for a sufficient time to allow the tube to deionize and decoupled capacitor from flashlamp.

Figure 1:
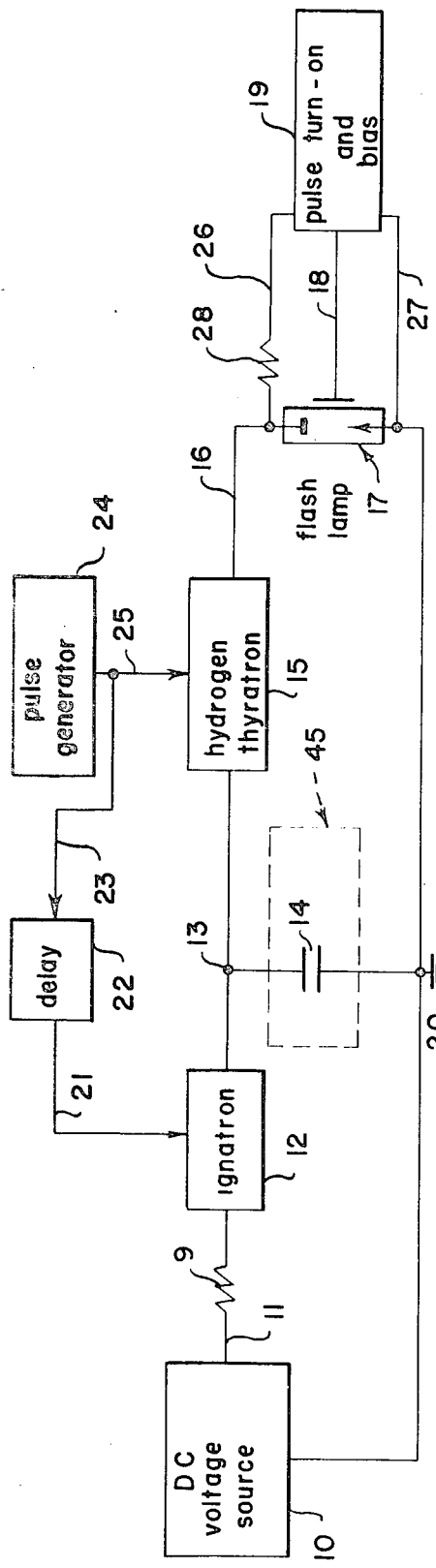
FIG. 1 is a schematic diagram of a prior art laser excitation system.

In FIG. 1 (prior art) a DC voltage is provided by DC voltage source 10 on conductor 11 connected to one end of current-limiting resistor 9. Ignatron 12 functions as a switch between the other end of resistor 9 and junction 13 and may be of a water cooled variety. Capacitor 14, within pulse forming network 45, is connected from junction 13 to ground 20. Thyratron 15 functions as a switch in the discharge path of capacitor 14, and connects junction 13 to conductor 16. Flashlamp 17 is connected between ground 20 and conductor 16, and is capacitively coupled to "pulse turn-on and bias circuitry" 19 via conductor 18. Resistor 28 and conductors 26 and 27, in conjunction with pulse turn-on and bias circuitry 19 are arranged to conduct a low level current bias through flashlamp 17. Pulse generator 24 provides a pulse to the grid of hydrogen thyratron 15 via conductor 25. Generator 24 also conducts an electrical pulse to delay circuitry 22 via conductor 23. The output from delay 22 is fed via conductor 21 to control grid drive circuitry (not shown) of ignatron 12.

In operation, consider capacitor 14 to be precharged to a predetermined voltage when pulse generator 24 provides a pulse to the control grid drive circuitry (not shown) of thyratron 15. Thyratron 15 is made to conduct, thereby discharging energy stored in capacitor 14 through flashlamp 17. Flashlamp 17 emits a light energization pulse to the laser (not shown).

At time of discharge of capacitor 14, ignatron 12 is in a state of nonconduction. After capacitor 14 discharges, the unionized state of ignatron 12 prevents capacitor 14 from immediately recharging. This condition of zero charge current forces thyratron 15 to deionize. After a finite delay determined by delay 22, ignatron 12 is made to turn on, or ionize, by a pulse supplied to its control grid drive circuitry via conductor 21.

After ignatron 12 ionizes capacitor 14 charges through resistor 9 to the voltage of DC voltage source 10. Ignatron 12 deionizes when its anode to cathode voltage is less than its ionizing voltage level. While capacitor 14 is charging, thyratron 15 is nonconducting (deionized) and remains in that state until a pulse from generator 25 is applied to control grid drive circuitry of thyratron 15.

Figure 2:
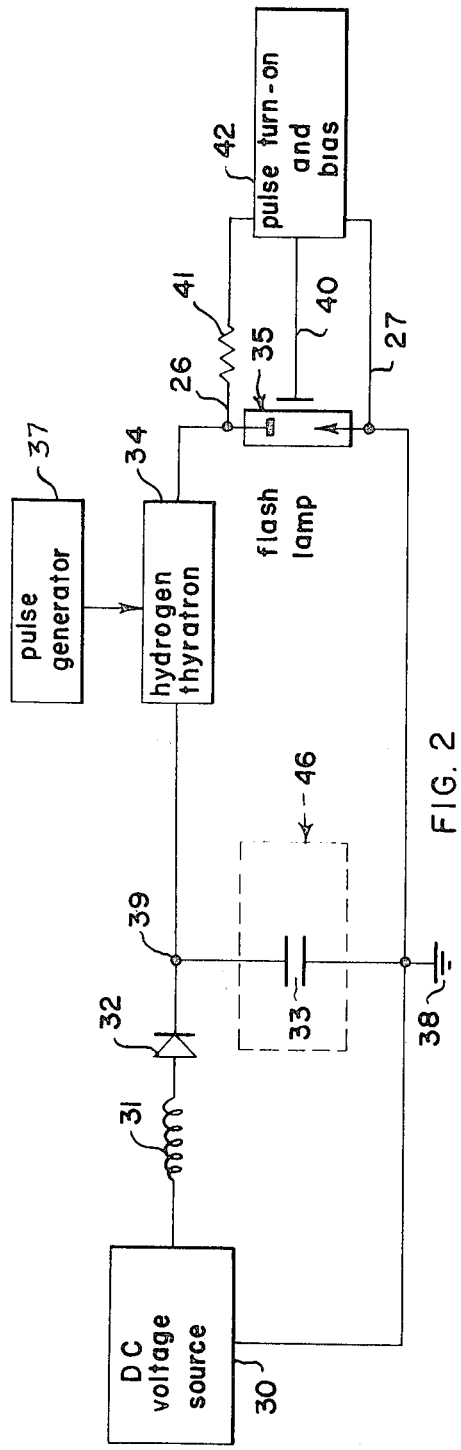
FIG. 2 is a schematic diagram of the preferred embodiment of the present invention showing a single ionization tube switch.

The preferred embodiment of FIG. 2 shows inductor 31 and diode 32 arranged in series, and substituted for ignatron 12 of FIG. 1. Additionally, delay circuitry 22 of FIG. 1 is not needed, nor show, in FIG. 2. DC voltage source 30 is connected between ground and one end of inductor 31, the other end connected to the anode of diode 32. The cathode of diode 32 is connected to junction 39. Capacitor 33 is connected between junction 39 and ground 38.

Hydrogen thyratron 34 is connected between junction 39 and one of flashlamp 35. The other end of flashlamp 35 is connected to ground 38. As before, pulse turn on and bias circuitry 42 is capacitively coupled via conductor 40 to flashlamp 35 and is arranged to provide a large flashlamp turn-on voltage pulse. Resistor 41 and conductors 26 and 27 again provide a current flow path for a low level bias current for flashlamp 35. Pulse generator 37 provides a pulse to grid drive circuitry (not shown) of hydrogen thyratron 34. The grid drive circuitry can be conceived as being part of an overall "pulse generator".

In operation, consider FIG. 4 wherein battery voltage 80 is supplied across the series arrangement of resistor 82, inductor 83 and capacitor 84 upon closure of switch 81. The resultant capacitor voltage is oscillatory and damped; it has a general waveshape 51 shown in FIG. 3. Damping is caused by resistor 82 which is, or can be, equivalent circuit resistance. The initial capacitor voltage peak is approximately twice the applied battery voltage, and occurs at time 57 equal to $\pi \sqrt{LC}$.

In FIG. 5, the circuitry is the same as in FIG. 4 with the exception that diode 85 is included. An effect of diode 85 is to prevent an oscillating condition because of its unidirectional current flow property. In FIG. 3, one observes an effect of diode 85 is constant voltage 52. This is peak voltage on capacitor 84 which is prevented from discharging the diode 85.

In FIG. 2 diode 32 performs the function performed by diode 85. Initially, consider capacitor 33, within pulse forming network 46, to be uncharged. Consider flashlamp 35 to be biased on. Consider DC voltage source 20 to be suddenly applied between ground 38 and one end of inductor 31 by means of a switch (not shown). Consider the thyratron 34 to be in an unionized state at this time.

The resulting voltage across capacitor 33 will take the shape of curves 50 and 52 in FIG. 3. Capacitor 33 will charge from zero volts to a voltage approximately equal to twice DC voltage source 30, along curve 50. Curve 50 is basically a negative cosine function. Capacitor 33 supports its DC voltage for a predetermined length of time, terminated by occurrence of a pulse from pulse generator 37 applied to control grid drive circuitry of thyratron 34.

FIG. 6 shows pulse 60 from pulse generator 37 as a narrow spike. This pulse, when applied to thyratron 34, causes discharge of capacitor 33 through ionized thyratron 34 and flashlamp 35. Flashlamp 35 provides a pulse of light to a laser (not shown) and is represented graphically in FIG. 7 by pulse 50.

In FIG. 3, curve segment 53 represents capacitor 33 discharge voltage. The beginning of the discharge of capacitor 33 occurs at an intersection of segments 53 and 52. The intersection is coincident with occurrence of pulse 60 in FIG. 6. Pulse 60 causes capacitor 33 to discharge as shown. This coincidence is shown by time coincidence line 58, interconnecting FIGS. 3, 7, and 6, in time.

Capacitor 33 discharge along curve segment 53 in FIG. 3 until it intersects dotted line segment 59. Segment 59 represents a successive capacitor-charging, which occurs simultaneously with capacitor-discharging. However, the effect of capacitor-charging at this time is negligible. The slope of segment 53, in reality, is more steep than shown in FIG. 3. It is shown herein with a gradual slope for purposes of clarity.

Voltage level 55 represents the ionization potential of thyratron 34. Segments 53 and 54 intersect at a voltage value represented by voltage level 61. Voltage level 61 is substantially below voltage level 55. Time 56 is the time required for capacitor 33 to charge from voltage level 61 to voltage level 55, and this time is sufficient to allow thyratron 34 to deionize. The tube cannot remain ionized if the capacitor voltage is less than its inherent ionization potential. Substitution of inductor 31 and diode 32 for ignatron 12 makes thyratron 34 "stall" after each discharge of capacitor 33.

Thyratron 34 can not turn on until segment 54 reaches ionization voltage level 55, which can vary from tube to tube. However, for a given tube, it remains approximately constant. The rate of rise of segment 54 is primarily a function of the values of inductor 31 and capacitor 33. Thus, it is seen from FIGS. 2 and 3 that deionization of thyratron 34 is solely a function of preventing or delaying the intersection of segment 54 (dependent solely on the inductor and capacitor) and level 55 (dependent solely on choice of thyratron). Therefore, operation of thyratron 34 is not dependent upon most other circuit parameters including the choice of flashlamp. Replacement of one flashlamp by another having different electrical characteristics does not require any compensating changes to the remaining circuitry.

Capacitor 33 is shown as being within pulse forming network 46. Pulse forming network 46 could comprise circuit elements other than a single capacitor 33. For example, PFN 46 could alternatively comprise an LC network, or other networks.

Furthermore, inductor 31 is shown as a single fixed inductance. It could be comprised of other inductors arranged in series and/or parallel combinations to provide various inductance values, for varying the charge-rate to rates more compatible with characteristics of other thyratron tubes and flashlamps.

The preferred embodiment and the best mode now known for the practice of the present invention comprises the following component values:

TABLE I

| DC Voltage Source | 30 | 725-1000 VDC; 13 a. |
| --- | --- | --- |
| Inductor | 31 | 63 Millihenries |
| Diode | 32 | 1N5331 |
| Capacitor | 33 | 38 Microfarads |
| Thyratron | 34 | EG and G - 7322 |
| Flashlamp | 35 | EG and G FX-85-3 |
| Resistor | 41 | 25K ohms |

The foregoing is a description of the spirit and essential characteristics of the invention. Other arrangements of components, and changes in circuit detail, may be made without departing from the spirit and scope of my invention which is defined by the appended claims.

I claim:

1. A system for optically pumping a laser, wherein said system comprises: at least one flashlamp; means for continuously preionizing said flashlamp; a DC voltage source; an electrical pulse generator; a capacitor; charge rate control means for repetitively charging said capacitor from said voltage source to at least a predetermined voltage and for maintaining said voltages on said capacitor; discharge means responsive to each of the pulses from said pulse generator for repetitively rapidly discharging said capacitor through said flashlamp, whereby said flashlamp is made to repetitively emit light energy at a predetermine pulse rate of said generator, the operation of said discharge means being independent of electrical characteristics of said flashlamp; and, at least part of said charge-rate control means in combination with said capacitor forming inhibiting means responsive to repetitive operation of said charge-rate control means for inhibiting each operation of said discharge means for a predetermined short interval of time.

2. A system as recited in claim 1 and wherein said predetermined voltages are approximately twice the voltage of said source.

3. A system as recited in claim 1 and wherein said discharge means comprises: an ionization tube having a control grid; and, means for repetitively applying each of the pulses from said generator to said grid.

4. A system as recited in claim 1 wherein said charge-rate control means includes a series combination of an inductor and a diode.

5. A system as recited in claim 3 and wherein said ionization tube is a hydrogen thyratron tube.

* * * * *